United States Patent

[11] 3,591,295

| [72] | Inventor | Arthur Bransdorfer |
| | | Huntington Station, N.Y. |
| [21] | Appl. No. | 796,675 |
| [22] | Filed | Feb. 5, 1969 |
| [45] | Patented | July 6, 1971 |
| [73] | Assignee | Itek Corporation |
| | | Lexington, Mass. |

[54] EXPOSURE SELECTOR FOR A PRINTER
2 Claims, 2 Drawing Figs.

[52] U.S. Cl. ................................................ 356/202,
356/204, 356/229
[51] Int. Cl. .................................................. G01n 21/06,
G01n 21/22, G01i 1/10
[50] Field of Search........................................... 356/202,
204, 226, 229—231

[56] References Cited
UNITED STATES PATENTS

| 2,333,759 | 11/1943 | Akelaitis | 356/202 |
| 2,478,406 | 8/1949 | Lamb | 356/202 |
| 2,956,473 | 10/1960 | Hunter | 356/202 |
| 3,323,430 | 6/1967 | Cooper, Jr. | 356/230 X |
| 3,323,431 | 6/1967 | Land | 356/230 X |
| 3,357,230 | 12/1967 | Topaz | 356/230 X |
| 3,368,447 | 2/1968 | Land et al. | 356/230 |
| 3,413,065 | 11/1968 | Funk | 356/202 |
| 3,413,066 | 11/1968 | Biber et al. | 356/230 |
| 3,416,866 | 12/1968 | Land et al. | 356/230 |
| 3,447,877 | 6/1969 | Cooper, Jr. | 356/230 |

*Primary Examiner*—Ronald L. Wibert
*Assistant Examiner*—Warren A. Sklar
*Attorneys*—Homer O. Blair, Robert L. Nathans and William C. Roch ABSTRACT: Apparatus for selecting the correct exposure time for each particular negative in a reader-printer. A hairline image which is movable is provided on the viewing screen of the reader-printer, and an image of the negative to be printed is projected on the viewing screen by a projector, the intensity of which is controlled by a variable resistor. When the image of the negative is viewed on the screen, the hairline is moved so that part of it crosses the darkest area of the projected image. The projector's light is then dimmed until the operator is unable to distinguish the hairline from the surrounding background of the dark portion of the projected image. The reading of the variable resistor at that point is calibrated to give the correct exposure time for the negative being printed.

PATENTED JUL 6 1971   3,591,295

ARTHUR BRANSDORFER
INVENTOR.

BY William C. Roch

AGENT.

EXPOSURE SELECTOR FOR A PRINTER

BACKGROUND OF THE INVENTION

This invention relates to the field of exposure control, and more particularly pertains to apparatus for determining the correct exposure time for a negative from which a print is being obtained in a reader-printer.

In the field of exposure control for prints, apparatus has been utilized in which the image of a negative is projected on a screen which has a pattern of light-transmitting quasi-black spots located thereon. A lamp of adjustable intensity, which is provided behind the screen is turned up to maximum intensity, and then the brilliance of projection of the negative's image is adjusted accordingly. The final step involves dimming the adjustable lamp until the light transmitting quasi-black spots just fade into the darker areas of the projected image. The setting of the adjustable lamp is then indicative of the proper exposure time for a print being made from the negative.

Other systems have been used in which the darker areas of the negative are visually compared with a reference which has a plurality of areas of differing densities. Each density of the reference is indicative of a different exposure time, and a match between the negative and one area of the standard yields the correct exposure time.

These prior art systems are undesirable because their operations were cumbersome and time consuming, and a fast and accurate reading of the exposure time could not be obtained.

SUMMARY OF THE INVENTION

The disclosed embodiment of the invention provides a method and apparatus for quickly and efficaciously providing an accurate indication of the correct exposure time for a print being made from a negative. Further, the invention is very simple to use, and even an unskilled operator can quickly determine the correct exposure time. Briefly, the embodiment provides a hairline image which is movable across the projection screen of a printer. When the image of a negative is viewed on the screen, the hairline is moved so that part of it crosses the darkest image area of the projection. The projector's light is then dimmed until the point when the operator is unable to distinguish the hairline from the surrounding background of the dark portion of the projected image. The relative intensity of the projector at that point is then utilized as an indication of the correct exposure time for the print.

These and other objects and features of the present invention will become apparent upon a perusal of the following specification taken in conjunction with the accompanying drawings wherein:

DESCRIPTION OF THE PREFERRED EMBODIMENT

Figure 1:
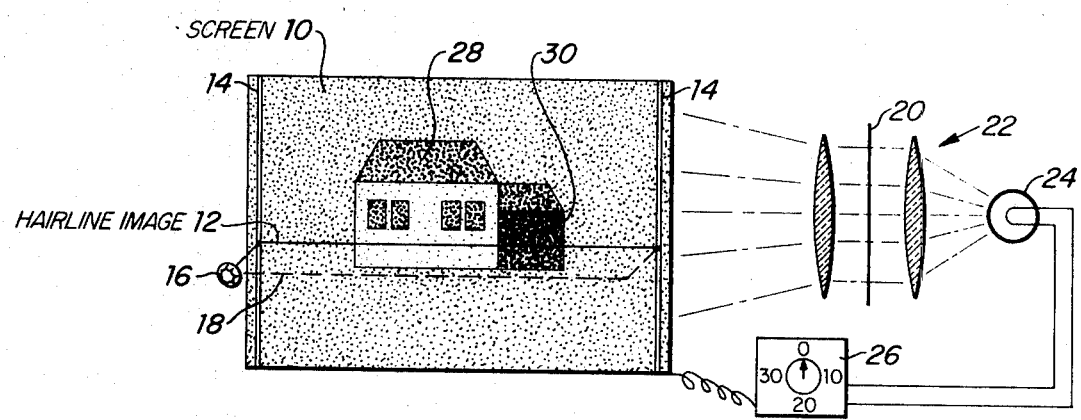
FIG. 1 depicts a schematic presentation of one embodiment of the invention. In this figure the image of a negative is being viewed on a projection screen before an exposure adjustment has been made.

In FIG. 1 there is shown a projection screen 10 which has a hairline image 12 which is disposed horizontally across the projection screen. In the preferred embodiment, the screen 10 is translucent and an image is projected upon the screen from behind the screen, as viewed in FIG. 1. In this embodiment the hairline is preferably located behind the screen 10. The hairline 12, which may be a string or a piece of wire, is supported for vertical movement in tracks 14 which are located on both sides of the viewing screen 10. Vertical movement of the hairline is controlled by a knob 16 via conventional mechanical connections 18. As shown in FIG. 1, the image of a negative 20 is being projected upon the screen 10 from behind the screen, as viewed in the Figure. The projection is accomplished via a conventional lens system 22 and a projection lamp 24. The relative density of the projected image is controlled in accordance with the brilliance of projection lamp 24 in a conventional manner by a variable resistor 26 which varies the power available to the lamp. The image of the negative 20 is cast upon screen 10 as a building 29 which has a section 30 which is darker than the remaining portions of the building.

Figure 2:
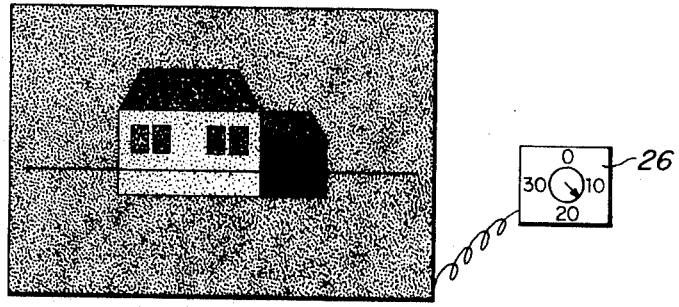
FIG. 2 is a view of the same projection screen as shown in FIG. 1 after the exposure adjustment has been made.

The operation of the invention is as follows: The image of the negative is projected onto the screen. The hairline 12 is then moved so that it crosses the darkest area of the projection, which is shown as 30 in FIG. 1. The resistor 26 is then adjusted so that the image of the hairline just fades into the darkest portion of the projected image, as shown in FIG. 2. At this point the hairline is indistinguishable from the projected darkest image. The reading of the resistor 26 is calibrated in terms of the correct exposure time for a print being formed from the negative, so that, as shown in FIG. 2, the correct exposure time for the negative, the image of which is projected on the screen, is 15 seconds.

In the preferred embodiment, the image was projected from behind screen 10, as viewed in FIG. 1. This arrangement might be replaced by another in which the image is projected upon the front of the screen, as viewed in FIG. 1. In this arrangement the hairline 12 would be located across the front of screen 10.

Also, the hairline is shown as being horizontal with movement in the vertical direction. This arrangement could be replaced by a vertical hairline which is movable in the horizontal direction. Alternatively, the reference hairline might be replaced by another reference, not a hairline, such as a dot which is movable in both the horizontal and vertical directions; or a pattern of dots might be disposed across the screen 10, in which case the proper dot would be selected which is located on the darkest area of the projected image. As another possibility, an image of the reference might be projected on the screen.

It should be understood that the foregoing disclosure relates to only a preferred embodiment of the invention and that numerous modifications may be made therein without departing from the spirit of the invention.

I claim:

1. In a reader-printer machine having a projection screen whereon the image of a transparency may be viewed, and means for projecting an image of the transparency onto the projection screen including a projection lamp for illuminating the transparency and a lens system for projecting an image of the illuminated transparency onto the projection screen, the improvement comprising apparatus for determining the correct exposure for a print being produced from the transparency, and including:
   a. reference mark means having a fixed density for comparison viewing with the projected image whereby the density of said reference mark means may be compared with the density of the densest portion of the projected image;
   b. means for varying the intensity of the illumination from said projection lamp to achieve a particular setting of said varying means at which the density of said densest portion is equal to the density of said fixed density reference mark means; and
   c. means for utilizing said particular setting of said varying means to produce a print with a correct exposure.

2. Apparatus as set forth in claim 1 wherein said reference mark means includes a hairline reference mark, and means are provided for moving said hairline reference mark relative to said projection screen whereby said hairline reference mark may be positioned at the section of said projection screen at which is located the densest portion of the projected image.